United States Patent
Laval et al.

(10) Patent No.: US 9,471,407 B2
(45) Date of Patent: Oct. 18, 2016

(54) PARAMETRIZABLE SYSTEM FOR CENTRALIZED MAINTENANCE INTENDED FOR AN AIRCRAFT

(71) Applicant: THALES, Neuilly-sur-Seine (FR)

(72) Inventors: Laurent Laval, Valence (FR); Pascal Marestin, Valence (FR); Michel Subelet, Cugnaux (FR)

(73) Assignee: Thales, Courbevoie (FR)

( * ) Notice: Subject to any disclaimer, the term of this patent is extended or adjusted under 35 U.S.C. 154(b) by 570 days.

(21) Appl. No.: 13/891,048

(22) Filed: May 9, 2013

(65) Prior Publication Data

US 2013/0304420 A1    Nov. 14, 2013

(51) Int. Cl.
*G06F 11/00* (2006.01)
*G05B 23/02* (2006.01)

(52) U.S. Cl.
CPC ........... *G06F 11/00* (2013.01); *G05B 23/0272* (2013.01); *G05B 23/0283* (2013.01)

(58) Field of Classification Search
CPC .......... G05B 23/0272; G05B 23/0283; G06F 11/00
USPC ................ 702/184; 701/1, 3, 14, 31.4, 32.1; 340/948, 425.5
See application file for complete search history.

(56) References Cited

U.S. PATENT DOCUMENTS

| | | | | |
|---|---|---|---|---|
| 894,838 A | * | 8/1908 | Leavitt | F42B 19/01 114/24 |
| 6,671,589 B2 | * | 12/2003 | Holst | G06F 8/61 244/1 R |
| 7,436,322 B2 | * | 10/2008 | Crank | B64D 45/0015 340/945 |
| 8,321,078 B2 | * | 11/2012 | Vial | G01C 23/005 340/945 |
| 8,442,702 B2 | * | 5/2013 | Geiter | G06N 5/045 701/3 |
| 8,996,201 B2 | * | 3/2015 | Vial | G01C 23/00 701/14 |

(Continued)

FOREIGN PATENT DOCUMENTS

EP    2149823 A1    2/2010
EP    2266880 A1    12/2010

(Continued)

*Primary Examiner* — Carol S Tsai
(74) *Attorney, Agent, or Firm* — Baker & Hostetler LLP

(57) ABSTRACT

A system for centralized maintenance, intended for an aircraft comprising a set of devices necessary for the flight and able to issue fault messages or alert messages, the maintenance system being able to communicate with this set of devices, comprises a software kernel parametrizable by means of a database of parameters, the software kernel comprising at least four elementary cells: a first cell for acquiring the fault messages and alert messages originating from the set of devices of the aircraft, a second cell for formulating a maintenance diagnosis defined by means of the fault messages and alert messages, a third cell for formulating and displaying a maintenance report to a maintenance operator of the aircraft, defined on the basis of the maintenance diagnosis, a fourth cell for communicating between the maintenance operator and the set of devices of the aircraft.

17 Claims, 3 Drawing Sheets

(56) References Cited

U.S. PATENT DOCUMENTS

Figure 1:
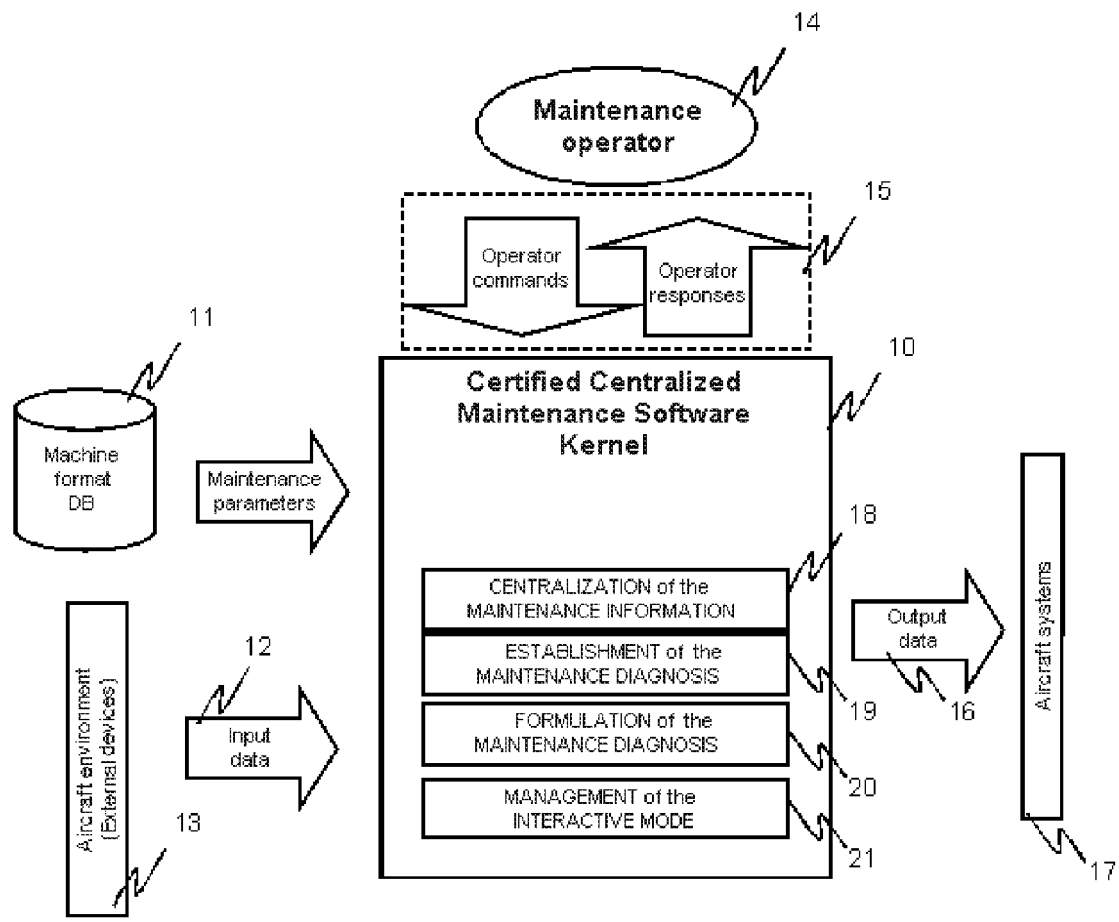

| | | | | |
|---|---|---|---|---|
| 2002/0143421 | A1* | 10/2002 | Wetzer | G06Q 10/06 700/100 |
| 2002/0143443 | A1* | 10/2002 | Betters | G01C 23/005 701/32.1 |
| 2006/0097854 | A1* | 5/2006 | Basu | G07C 5/006 340/425.5 |
| 2008/0147740 | A1 | 6/2008 | Bailly et al. | |
| 2008/0249678 | A1* | 10/2008 | Bailly | G05B 23/0281 701/31.4 |
| 2010/0100286 | A1 | 4/2010 | Genissel | |
| 2010/0145553 | A1* | 6/2010 | Vial | G01C 23/00 701/3 |
| 2010/0204855 | A1* | 8/2010 | Vial | G05B 23/0272 701/14 |
| 2011/0193724 | A1* | 8/2011 | Cases | G08B 23/00 340/945 |
| 2012/0143405 | A1* | 6/2012 | Cabos | G07C 5/008 701/3 |
| 2013/0197739 | A1* | 8/2013 | Gallagher | B64F 5/0045 701/31.5 |
| 2014/0309820 | A1* | 10/2014 | O'Dell | B64F 5/0045 701/3 |

FOREIGN PATENT DOCUMENTS

| | | |
|---|---|---|
| FR | 2909792 A1 | 6/2008 |
| GB | 2477205 A | 7/2011 |
| WO | 03/042769 A1 | 5/2003 |

\* cited by examiner

PARAMETRIZABLE SYSTEM FOR CENTRALIZED MAINTENANCE INTENDED FOR AN AIRCRAFT

CROSS-REFERENCE TO RELATED APPLICATION

This application claims priority to foreign French patent application No. FR 1201373, filed on May 11, 2012, the disclosure of which is incorporated by reference in its entirety.

TECHNICAL FIELD

The present invention belongs to the field of the maintenance of a set of devices of an aircraft. More precisely, it applies to systems for centralized maintenance which gather and organize fault messages or alert messages originating from various devices or functions necessary for the flight of the aircraft.

BACKGROUND

An aircraft comprises a large number of devices, of various kinds, mechanical, hydraulic, electrical or electronic whose proper operation is essential in the course of a flight. To improve the degree of confidence accorded to these devices, each of them is subjected to monitoring of their proper operation consisting in monitoring the fundamental parameters and in automatic or semi-automatic tests of operation, followed by fault diagnosis that may lead to the issuing of fault messages. This monitoring of proper operation, associated with a device, is known by the name BITE function, derived from the acronym "Built In Test Equipment". The set of fault messages is in general grouped together initially by main function of an aircraft within the computer in charge of the function. Such is the case for example for the monitoring of the faults related to automatic piloting AP or to the flight management system FMS. Such is also the case for the alert messages gathered in the FWS ("Flight Warning System") computer. Subsequently, a so-called centralized-maintenance computer gathers and organizes the fault messages and the alert messages originating from the set of computers of the aircraft. This centralized facility, known by the name "Central Maintenance Computer", is accessible to the crew through an interface with keyboard and screen in the cockpit of the aircraft; it is also accessible to an operator during maintenance operations carried out when the aircraft is on the ground.

The main function of the centralized maintenance is to carry out, in real time or at the end of the flight, a diagnosis of the general situation of the aircraft on the basis of a summary of the fault and alert messages received from the various devices of the aircraft. It also fulfils other functions such as the correlation of the fault messages received with the alerts received at the level of the flight deck, the conduct of the particular tests on the devices undertaken on request by an operator, or the drafting of reports destined for the ground maintenance teams. These maintenance reports incorporate a log of the fault messages issued by the various devices of the aircraft and alerts presented to the crew as well as the summary of the fault messages carried out as a last resort. More generally, they contain all the information about the operating states of the devices, liable to facilitate the work of the ground maintenance team.

Conventionally, through its functionality, the system for centralized maintenance is connected to several tens of devices or computers, each being able potentially to generate tens or indeed hundreds of fault messages.

The development and maintenance of such a system is complex and expensive since it depends not only on the technical specifications of the devices of the aircraft but also on the operational customs and procedures of aircraft manufacturers and operators. The function adheres strongly to the aeroplane's system definition. Fine tuning is lengthy and complex due to the very large number of connected devices to be processed (more than a hundred computers for a high-capacity aircraft) and to the diversity of the protocols. The design of such a system is prone to numerous iterations of software development, as the aircraft manufacturer converges in maturity in the expression of his requirement, that is to say in the knowledge of the behaviour of the devices in an empirical manner, before and after commissioning into service.

It is therefore important to be able to upgrade the system for centralized maintenance, for example for the modification of the man machine interface (MMI), the addition of parameters, the addition of devices, or the improvement of the diagnoses, without any software certification activity. This condition is not realized by the systems for centralized maintenance of the prior art which exhibit the characteristic of being developed, having regard to the certification constraints, as a monolithic sequential code. Lengthy design and validations, carried out at the end of an aircraft's development cycle, are necessary to integrate into the system for centralized maintenance the upgrades of the other subsystems of the aircraft and of their diagnostic functions. Regular software updates must be organized during the development and in a subsequent phase of commercial operation of the aircraft.

SUMMARY OF THE INVENTION

The proposed solution relies on separating the system for centralized maintenance into a generic software kernel and configuration parameters which can evolve over time.

For this purpose the invention is aimed at a system for centralized maintenance, intended for an aircraft comprising a set of devices necessary for the flight and able to issue fault messages or alert messages, the said maintenance system being able to communicate with this set of devices. The system for centralized maintenance comprises a software kernel parametrizable by means of a database of parameters, the said software kernel comprising at least four elementary cells:
  a first cell for acquiring the fault messages and alert messages originating from the set of devices of the aircraft,
  a second cell for formulating a maintenance diagnosis defined by means of the fault messages and alert messages,
  a third cell for formulating and displaying a maintenance report to a maintenance operator of the aircraft, defined on the basis of the maintenance diagnosis,
  a fourth cell for communicating between the maintenance operator and the set of devices of the aircraft,
each of the cells comprising a software engine parametrizable by the database of parameters.

Advantageously, the first cell for acquiring the fault messages and alert messages, furthermore comprises means for broadcasting general parameters to the set of devices, the said general parameters comprising at least, the date and the time, a flight number, a departure and destination airport, or a serial number of the aircraft.

Advantageously, the second cell for formulating a maintenance diagnosis comprises means for: filtering the fault messages and alert messages, by means of criteria defined in the database of parameters, establishing consistency between the fault messages and/or the alert messages, formulating a maintenance diagnosis.

Advantageously, the maintenance system comprises means for storing aboard the aircraft one or more databases of parameters, and means for selecting a database used to parameterize each of the elementary cells of the software kernel.

Advantageously, the system for centralized maintenance furthermore comprises means for verifying compatibility between the database of parameters and each of the elementary cells of the software kernel.

Advantageously, the system for centralized maintenance furthermore comprises a qualified configuration tool making it possible to convert a configuration file describing an operational requirement of the system for centralized maintenance by means of a set of parameters structured in accordance with a configuration domain, into a database of parameters able to parameterize the software kernel of the system for centralized maintenance.

Advantageously, the configuration domain comprises the definition of at least: the set of devices of the aircraft, of their communication protocols, and of the physical interfaces of the device in the aircraft, the fault messages associated with each device, criteria for filtering and consistency analysis of the fault messages and/or alert messages, criteria for sorting the fault and alert messages, able to define a tree of the maintenance report, or interactive sequences between a maintenance operator and a device.

The invention also pertains to a method of centralized maintenance of an aircraft comprising a set of devices necessary for the flight and able to issue fault messages or alert messages, comprising calculation steps, parametrizable by means of a binary database of parameters for: the acquisition of the fault messages and alert messages issued by the set of devices of the aircraft, the formulation of a maintenance diagnosis determined on the basis of the fault messages and alert messages, the formulation and the display of a maintenance report on a graphical interface destined for a maintenance operator of the aircraft, determined on the basis of the maintenance diagnosis, the communication between the maintenance operator and the set of devices of the aircraft.

The invention also pertains to a program product comprising code instructions making it possible to perform the steps of the method of centralized maintenance having the characteristics described above.

The invention finally pertains to a method for developing a system for centralized maintenance having the characteristics described above, comprising a step of defining a configuration domain, the said configuration domain being able by parameterization to cover a wide spectrum of operational requirements of the system for centralized maintenance, and a step of programming and certifying several generic software engines.

BRIEF DESCRIPTION OF THE ACCOMPANYING DRAWINGS

Figure 2:
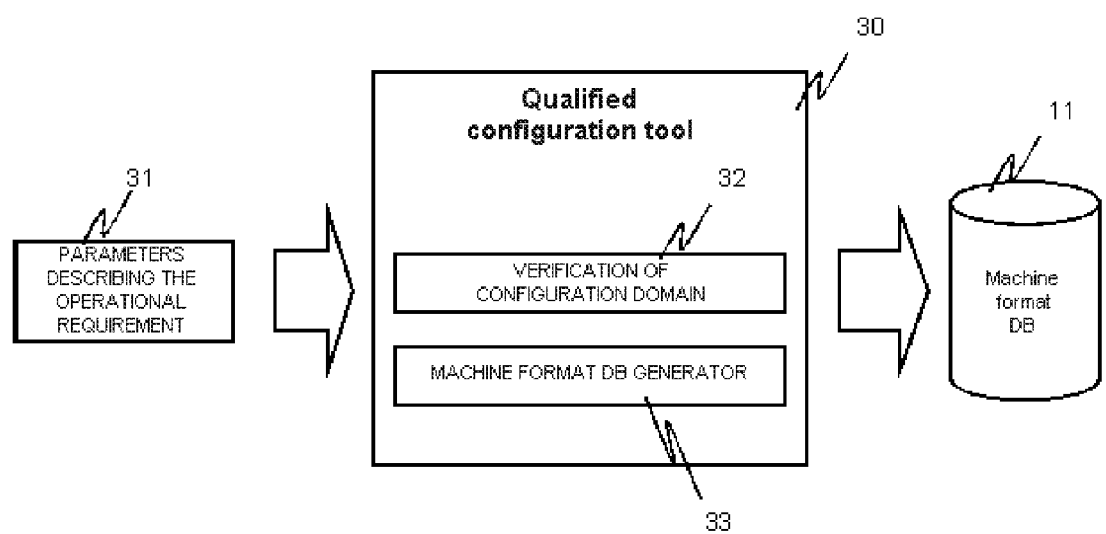
Figure 3:
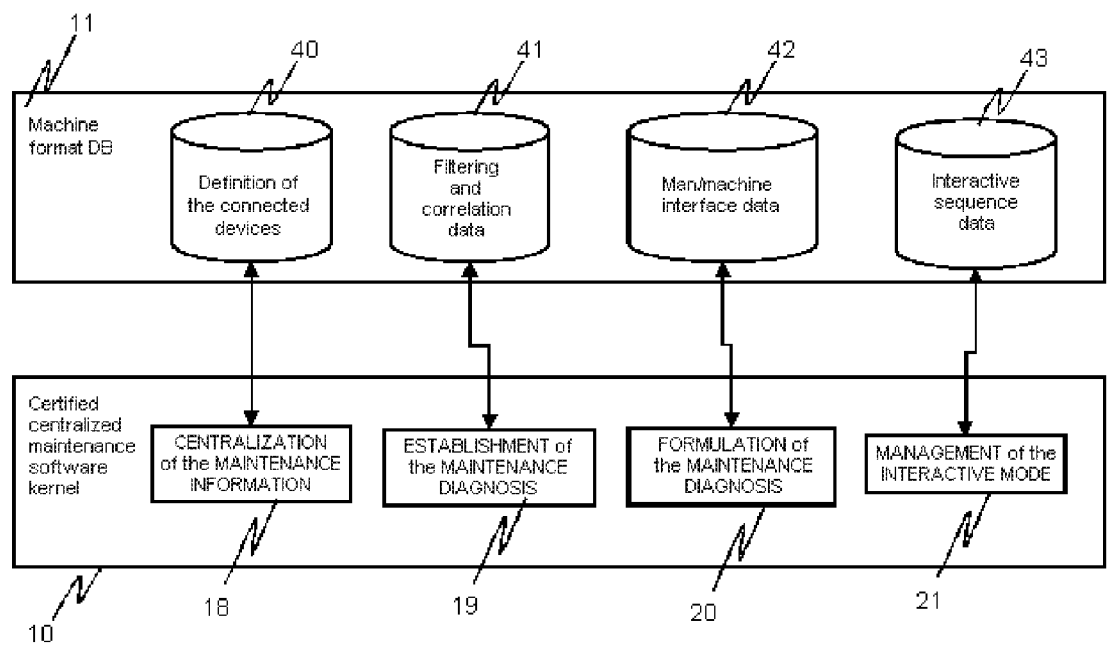

The invention will be better understood and other advantages will become apparent on reading the detailed description of the embodiments given by way of example in the following figures:

FIG. 1 represents the simplified functional architecture and the relationships of a system for centralized maintenance aboard an aircraft comprising a certified software kernel according to the invention, FIG. 2 represents the simplified functional architecture of a qualified configuration tool for a system for centralized maintenance according to the invention, FIG. 3 represents an example of links between the certified software kernel and a database suitable for parametrizing the certified software kernel according to the invention.

For the sake of clarity, the same elements will bear the same labels in the various figures.

DETAILED DESCRIPTION

FIG. 1 represents the simplified functional architecture and the relationships of a system for centralized maintenance aboard an aircraft comprising a certified software kernel. The system for centralized maintenance according to the invention is intended for an aircraft comprising a set of devices necessary for the flight and able to issue fault messages and alert messages. These devices can be of various kinds (mechanical, hydraulic, electrical or electronic). They contain means for monitoring the fundamental parameters and tests of proper operation that may lead to the issuing of fault messages. In accordance with the regulatory stipulations in force, the aircraft is also equipped with an alert message management facility (FWS, for "Flight Warning System") able to issue alert messages. The system for centralized maintenance is therefore connected to several computers which host the functions necessary for the flight of the aircraft and relay the fault messages and the alert messages originating from the devices to the said system for centralized maintenance. For a wide-bodied craft, the system for centralized maintenance may be connected to nearly a hundred computers aboard the aircraft.

According to the invention, the system for centralized maintenance comprises a software kernel 10 parametrizable by means of a database of parameters 11. The software kernel 10 has as input data 12 fault messages and alert messages issued by the set of devices of the aircraft, also called the aircraft environment 13. Typically, a fault message consists of a normalized code and of text parameters associated with this code. The software kernel 10 is also in interaction with a maintenance operator 14, by means of one or more MMI interfaces 15 of screen-keyboard type. The role of the software kernel 10 is also to communicate output data 16 with sub-systems 17 of the aircraft.

The software kernel 10 comprises at least four elementary cells:
- a first cell 18 for acquiring the fault messages and alert messages originating from the set of devices of the aircraft,
- a second cell 19 for formulating a maintenance diagnosis defined by means of the fault messages and alert messages,
- a third cell 20 for formulating and displaying a maintenance report to a maintenance operator 14 of the aircraft, defined on the basis of the maintenance diagnosis,
- a fourth cell 21 for communicating between the maintenance operator 14 and the set of devices of the aircraft.

Each of the cells 18, 19, 20 and 21 comprises a certified software engine, parametrizable by the database of parameters 11. Thus, the generic software kernel 10 of the system for centralized maintenance allows each of the cells to access the database 11 to retrieve its specific configuration parameters in order to adapt its capabilities and its behaviour. In particular, on external events such as fault messages, alert messages, commands originating from the maintenance operator, etc., the software kernel accesses the database to retrieve the parameters defining the behaviour associated with these events.

According to the invention, the role of the first acquisition cell 18 is the centralization of the maintenance information. It ensures the interface with the set of devices of the aircraft. For each member of this set (a member is typically a computer of the aircraft), the first cell ensures notably:
 the acquisition of the fault messages of each member,
 the acquisition of the alert messages, or CAS messages, the acronym standing for "Crew Alerting System"

This first cell 18 for acquiring the fault messages and alert messages, furthermore comprises means for broadcasting general parameters to the set of devices, the said general parameters comprising notably the flight phase, the date and the time, a flight number, a departure and destination airport, a serial number of the aircraft.

The role of the second cell 19 is to establish a maintenance diagnosis. The software engine of this cell makes it possible to analyse the data collected by the first cell, to filter them, and to perform the correlation in a dynamic manner (for example by a temporal correlation between CAS messages and fault messages or a temporal correlation between fault messages) or static manner between these data, that is to say to search for the consistency between the various messages, with the aim of constructing a maintenance diagnosis for the aircraft. By way of example, if a component C is considered which periodically transmits information to the computers A and B. When a fault arises with the component C, the computers A and B issue a fault message to the centralized maintenance. On receipt of these two messages, the centralized maintenance diagnoses, in accordance with the parameterization via the database, the fault with the component C.

Stated otherwise, the second cell 19 for formulating a maintenance diagnosis comprises means for:
 filtering the fault messages and the alert messages, by means of criteria defined in the database of parameters,
 establishing consistency between the fault messages and/or the alert messages,
 formulating a maintenance diagnosis.

The role of the third cell 20 is to formulate maintenance reports. The software engine of this cell organizes the feedback of the diagnosis to the maintenance operator 14. This entails in particular organizing into several menus the maintenance report displayed by the MMI interface 15 to the maintenance operator.

The role of the fourth cell 21 is the management of an interactive mode. The software engine of this cell allows dialogue between the maintenance operator and the members of the set of devices of the aircraft. It manages the interactive commands and responses between the maintenance operator and the diagnosed devices. By way of example, the software engine can handle the following interactions: interactive tests for fault confirmation, the retrieval of recorded data of a system for aiding the analysis of a problem, or the retrieval and presentation of the current data of a system.

According to the invention, the system for centralized maintenance advantageously comprises means for storing aboard the aircraft one or more databases of parameters, and means for selecting a database 11 used to parameterize each of the elementary cells of the software kernel 10.

Advantageously, the system for centralized maintenance furthermore comprises means for verifying compatibility between the selected database of parameters 11 and each of the elementary cells of the software kernel 10.

FIG. 2 represents the simplified functional architecture of a qualified configuration tool for a system for centralized maintenance. According to the invention, a qualified configuration tool 30 makes it possible to convert a configuration file 31 describing an operational requirement of the system for centralized maintenance by means of a structured set of parameters, into a database of parameters 11 able to parameterize the software kernel 10 of the system for centralized maintenance.

The qualified configuration tool 30 comprises a first module 32 making it possible to verify that the configuration file 31 complies with a predetermined configuration domain, and a second module 33 making it possible to convert the configuration file 31 consisting of marked-up text parameters into a database of parameters 11 in the machine format.

Typically, the configuration file 31 contains the variable parameters of the system for centralized maintenance, which are peculiar to the characteristics of the aircraft, to the specific requirements of the aircraft manufacturer or of the operator, to constraints of interaction between the maintenance operator and a set of devices of the aircraft. The content of the configuration file 31 is humanly comprehensible; several formats are possible for the configuration file 31, and notably XML, HTML, XHTML, LaTeX or any other structured text format. The configuration tool 31 is qualified, that is to say the machine code generated for the database of parameters 11 is not subject to obtaining of certification credits.

The configuration domain defines the format in which the operational requirement of the system for centralized maintenance must be described. It is for this set of parameters and their defined ranges of values that the software kernel has been developed and certified in accordance with the legislation in force. According to the invention, the configuration domain comprises:
 the definition of the set of devices of the aircraft, of their communication protocols (for example A624 support A664, A624 support A429, A604 BOFR, A604 Standard A, discrete), and the characterization of the physical interfaces of the device on the aircraft (links with the other devices, redundant links, electrical power supply),
 the definition of the fault messages associated with each device,
 the definition of criteria for filtering and consistency analysis of the fault messages and/or alert messages,
 the definition of criteria for sorting the fault and alert messages, able to define a tree of the maintenance report,
 and/or the definition of interactive sequences between the maintenance operator and a device, such as for example interactive tests for fault confirmation, the retrieval of recorded data of a system for aiding the analysis of a problem, or the retrieval and presentation of the current data of a system.

By way of nonlimiting example, a so-called "discrete fault" fault message can be defined in accordance with the configuration domain by:
 the identification of the signal, in accordance with the interfaces of the system,
 the expected value of the signal making it possible to generate the fault, the confirmation time associated with this change of state making it possible to consider that the fault is present or has disappeared.

The person skilled in the art is aware of other types of fault, such as for example faults of BOFR type, the acronym standing for "Bit Oriented Fault Reporting", faults of A604 StdA type, or else A624 faults. For all these faults, the configuration domain contains a certain number of parameters making it possible to define these faults and to implement the system for centralized maintenance.

The configuration domain also contains the parameters for the definition of the filtering and of the correlation of the fault messages and alert messages. The definition of the filtering comprises filtering rules which can be applied to the particular fault messages or to all the fault messages of a member of the set of devices of the aircraft or to alert messages, either in real time, at the moment they occur or later in time so as to carry out post-processing. The definition of the correlation defines static or dynamic rules making it possible to carry out a correlation between fault messages and CAS messages.

The configuration domain furthermore contains the parameters for the definition of the man machine interface, and in particular:
the definition and the options for navigation in the menus of the centralized maintenance interface,
the choice and location of the "widgets", visual elements of a graphical interface such as button, scrollbar, pop-up list, etc. for the interactive pages,
the definition of the menus suited to the airline's maintenance operations,
the definition of the presentation of the maintenance reports to the maintenance operator. This includes notably a set of possible sorting keys for organizing the maintenance report, by category of fault, by flight phase, or by ground fault.

Finally, the configuration domain contains the definition of the interactive sequences implemented by the fourth cell 21 for the management of the interactive mode. Typically, this consists for a given device in defining the exchanges between the centralized maintenance and the computer (interactive tests for fault confirmation, retrieval of recorded data of a system for aiding the analysis of a problem, retrieval and presentation of the current data of a system).

The implementation of a system for centralized maintenance according to the invention is particularly advantageous since it makes it possible to isolate a stable part which is certified from a variable part which contains the parametrizable information. This implementation makes it possible notably to circumvent the difficulties of the systems according to the prior art for which an adaptation to a new carrier or to changes on one and the same carrier made it necessary to carry out specific activities of specification, development, verification, validation and to provide the proofs of these activities to the certifying body. The whole cycle was lengthy, and expensive. Regarding the switch from one carrier to another, certain elements were able to be reused in an opportunistic manner in favourable cases, but without the possibility of transferring over the certification credits obtained previously.

FIG. 3 represents an example of links between the certified software kernel and a database suitable for parametrizing the certified software kernel. The software kernel 10 comprises, as described previously, a first cell 18 for acquiring the fault messages and alert messages, a second cell 19 for formulating a maintenance diagnosis, a third cell 20 for formulating and displaying a maintenance report, and a fourth cell 21 for communicating between the maintenance operator 14 and the set of devices of the aircraft. A database 11 makes it possible to parameterize each of the cells 18, 19, 20 and 21 of the software kernel 10. Stated otherwise, each cell recovers from the database 11 the set of parameters necessary for its operation.

In a favoured embodiment of the invention represented in the figure, the database 11 is split up into several independent databases 40, 41, 42 and 43, able to parameterize respectively the cells 18, 19, 20 and 21. Stated otherwise, with each cell is associated an independent database for the parameterization of the said cell. Such an implementation exhibits the advantage of making it possible to update each of the databases 40, 41, 42 and 43 independently of the remainder of the system for centralized maintenance. Thus, these databases 40, 41, 42 and 43 can be formulated as a function of the updating requirement (data update frequency or update carried out by different users).

The invention also pertains to a method of centralized maintenance of an aircraft comprising a set of devices necessary for the flight and able to issue fault messages or alert messages, characterized in that it comprises calculation steps, parametrizable by means of a binary database of parameters, for:
the acquisition of fault messages and of alert messages issued by the set of devices of the aircraft,
the formulation of a maintenance diagnosis determined on the basis of the fault messages and alert messages,
the formulation and the display of a maintenance report on a graphical interface destined for a maintenance operator 14 of the aircraft,
the communication between the maintenance operator 14 and the set of devices of the aircraft.

The invention also pertains to a program product comprising code instructions making it possible to perform the steps of the method of centralized maintenance having the characteristics described above.

The invention pertains finally to a method for developing a system for centralized maintenance having the characteristics described above, characterized in that it comprises a step of defining a configuration domain, the said configuration domain being able by parameterization to cover a wide spectrum of operational requirements of the system for centralized maintenance, and a step of programming and certifying several generic software engines.

The invention claimed is:

1. A system for centralized maintenance, intended for an aircraft comprising a set of devices necessary for flight and configured to issue fault messages or alert messages, said centralized maintenance system configured to communicate with the set of devices, comprising a certified software kernel parameterizable by means of a database of parameters, said certified software kernel comprising at least four elementary cells:
a first cell for acquiring the fault messages and alert messages originating from the set of devices of the aircraft,
a second cell for formulating a maintenance diagnosis defined by means of the fault messages and alert messages,
a third cell for formulating and displaying a maintenance report to a maintenance operator of the aircraft, defined on a basis of the maintenance diagnosis, and
a fourth cell for communicating between the maintenance operator and the set of devices of the aircraft,
wherein each of the cells comprising a certified software engine parameterizable by the database of parameters.

2. The system for centralized maintenance according to claim 1, wherein the first cell for acquiring the fault messages and alert messages, further comprises means for broadcasting general parameters to the set of devices, said general parameters comprising at least, the date and the time, a flight number, a departure and destination airport, or a serial number of the aircraft.

3. The system for centralized maintenance according to claim 1, wherein the second cell for formulating a maintenance diagnosis comprises means for:
filtering the fault messages and the alert messages, by means of criteria defined in the database of parameters,
establishing consistency between the fault messages and/or the alert messages,
formulating a maintenance diagnosis.

4. The system for centralized maintenance according to claim 1, comprising means for storing aboard the aircraft one or more databases of parameters, and means for selecting a database used to parameterize each of the elementary cells of the software kernel.

5. The system for centralized maintenance according to claim 1, comprising means for verifying compatibility between the database of parameters and each of the elementary cells of the certified software kernel.

6. The system for centralized maintenance according to claim 1, comprising a qualified configuration tool making it possible to convert a configuration file describing an operational requirement of the system for centralized maintenance by means of a set of parameters structured in accordance with a configuration domain, into a database of parameters able to parameterize the certified software kernel of the system for centralized maintenance.

7. The system for centralized maintenance according to claim 6, wherein the configuration domain comprises the definition of at least:
the set of devices of the aircraft, of their communication protocols, and of the physical interfaces of the device in the aircraft,
the fault messages associated with each device,
criteria for filtering and consistency analysis of the fault messages and/or alert messages,
criteria for sorting the fault and alert messages, able to define a tree of the maintenance report,
or interactive sequences between a maintenance operator and a device.

8. A method of centralized maintenance of an aircraft carried out by a centralized maintenance system, said centralized maintenance system comprising a set of devices necessary for flight and configured to issue fault messages or alert messages and
said centralized maintenance system being configured to communicate with the set of devices and comprising a certified software kernel parameterizable by means of a database of parameters,
the method, comprising calculation steps, each of the calculation steps comprise implementation with a certified software engine, parameterizable by means of a database of binary parameters for:
acquisition of the fault messages and alert messages issued by the set of devices of the aircraft,
formulation of a maintenance diagnosis determined on a basis of the fault messages and alert messages,
formulation and display of a maintenance report on a graphical interface destined for a maintenance operator of the aircraft, determined on a basis of the maintenance diagnosis, and
communication between the maintenance operator and the set of devices of the aircraft.

9. A program product comprising code instructions making it possible to perform the steps of the method of centralized maintenance according to claim 8.

10. A method for developing a system for centralized maintenance according to claim 1, comprising a step of defining a configuration domain, said configuration domain being able by parameterization to cover a wide spectrum of operational requirements of the system for centralized maintenance, and a step of programming and certifying several generic software engines.

11. A system for centralized maintenance implemented for an aircraft comprising a set of devices necessary for flight and configured to issue fault messages or alert messages, said centralized maintenance system configured to communicate with the set of devices, said centralized maintenance system comprising a certified software kernel parameterizable by a database of parameters, said certified software kernel comprising at least four elementary cells, said centralized maintenance system comprising:
a first cell implemented by a centralized maintenance computer for acquiring the fault messages and alert messages originating from the set of devices of the aircraft,
a second cell implemented by the centralized maintenance computer for formulating a maintenance diagnosis defined by means of the fault messages and alert messages,
a third cell implemented by the centralized maintenance computer for formulating and displaying a maintenance report to a maintenance operator of the aircraft, defined on a basis of the maintenance diagnosis, and
a fourth cell implemented by the centralized maintenance computer for communicating between the maintenance operator and the set of devices of the aircraft,
wherein each of the cells comprising a certified software engine parameterizable by the database of parameters.

12. The system for centralized maintenance according to claim 11, wherein the first cell for acquiring the fault messages and alert messages, further comprises means for broadcasting general parameters to the set of devices, said general parameters comprising at least, the date and the time, a flight number, a departure and destination airport, or a serial number of the aircraft.

13. The system for centralized maintenance according to claim 11, wherein the second cell for formulating a maintenance diagnosis comprises means for:
filtering the fault messages and the alert messages, by means of criteria defined in the database of parameters,
establishing consistency between the fault messages and/or the alert messages, and
formulating a maintenance diagnosis.

14. The system for centralized maintenance according to claim 11, comprising means for storing aboard the aircraft one or more databases of parameters, and means for selecting a database used to parameterize each of the elementary cells of the software kernel.

15. The system for centralized maintenance according to claim 11, comprising means for verifying compatibility between the database of parameters and each of the elementary cells of the certified software kernel.

16. The system for centralized maintenance according to claim 11, comprising a qualified configuration tool making it possible to convert a configuration file describing an operational requirement of the system for centralized maintenance by means of a set of parameters structured in accordance with a configuration domain, into a database of parameters able to parameterize the certified software kernel of the system for centralized maintenance.

17. The system for centralized maintenance according to claim 16, wherein the configuration domain comprises the definition of at least:
  the set of devices of the aircraft, of their communication protocols, and of the physical interfaces of the device in the aircraft,
  the fault messages associated with each device,
  criteria for filtering and consistency analysis of the fault messages and/or alert messages, and
  criteria for sorting the fault and alert messages, able to define a tree of the maintenance report, or interactive sequences between a maintenance operator and a device.

* * * * *